United States Patent [19]
Maijers et al.

[11] Patent Number: 5,245,513
[45] Date of Patent: Sep. 14, 1993

[54] ELECTROLYTIC FOIL CAPACITOR

[75] Inventors: Andries C. Maijers; Antonius G. Rijnbeek, both of Eindhoven, Netherlands

[73] Assignee: U.S. Philips Corporation, New York, N.Y.

[21] Appl. No.: 703,513

[22] Filed: May 21, 1991

[30] Foreign Application Priority Data

May 23, 1990 [NL] Netherlands .................. 9001190

[51] Int. Cl.⁵ .................................... H01G 1/14
[52] U.S. Cl. .................................... 361/520
[58] Field of Search ................. 29/25.42, 25.03; 361/306, 272, 327, 503, 511, 513, 516–520, 521, 530, 535–540

[56] References Cited

U.S. PATENT DOCUMENTS

| | | | |
|---|---|---|---|
| 2,665,329 | 1/1954 | Brennan | 361/520 |
| 3,354,359 | 11/1967 | Ford | 361/520 |
| 4,326,642 | 4/1982 | Wolf | 361/520 X |

FOREIGN PATENT DOCUMENTS 2805644  8/1979  Fed. Rep. of Germany.

Primary Examiner—Donald A. Griffin
Attorney, Agent, or Firm—Robert J. Kraus

[57] ABSTRACT

An electrolytic capacitor which is suitable for SMD-mounting is described. The capacitor is closed by a flat cover which seals the capacitor under a clamping force in a gas-tight and liquid-tight manner through an elastic sealing material. The direction of the clamping force extends substantially in the plane of the cover. The capacitor is also provided with a shear flange which causes the diffusion path of the electrolyte liquid around the sealing material to be extra long.

4 Claims, 2 Drawing Sheets

ELECTROLYTIC FOIL CAPACITOR

BACKGROUND OF THE INVENTION

The invention relates to an electrolytic foil capacitor comprising a capacitor roll which is impregnated with electrolyte liquid, which capacitor roll is accommodated in a metal housing which is open at one end and which is sealed in a gas-tight and liquid-tight manner at the open end by a flat, metal cover which is provided with an elastic sealing ring.

An electrolytic capacitor of the type mentioned in the opening paragraph is known from the published German Patent Application DE-OS 28.05.644. In said Patent Application a description is given of a capacitor having a cylindrical housing which is closed by means of a metal cover. The round cover is circumferentially provided with an elastic sealing ring. In the housing there is provided a circular, inwardly directed ridge on which the cover rests via the sealing ring. As the edge of the housing is flanged in such a manner that it presses on the cover, the cover engages the circular ridge in the housing in a clamping manner via the sealing ring. The exerted clamping force extends predominantly in the axial direction. By means of said construction a gas-tight and water-tight housing is obtained.

The known capacitor has disadvantages. When the seal described therein is provided in electrolytic foil capacitors of small dimensions, such as SMD-capacitors, no optimum sealing is obtained. This is particularly true when these capacitors are mounted on a printed circuit board. During the soldering of such a SMD-capacitor an overpressure is formed in the capacitor as a result of the relatively high temperature used. Owing to this, the cover may be pressed off the ridge and, consequently, leakage may occur. This problem cannot be solved entirely by flanging the edge of the housing against the cover. Besides, the flanging of housings is very difficult when the dimensions of the currently customary SMD-electrolytes are taken into account. This is particularly true when the outside of the housing must be beam-shaped. In this case, the wall of the beam-shaped housing must be relatively thick.

SUMMARY OF THE INVENTION

It is an object of the invention to provide, inter alia, an electrolytic foil capacitor which does not have the above disadvantages. More in particular, such a capacitor will have to be provided with a leak-proof seal. Further, it must be possible to mass-produce the intended capacitor in an easy and cost-effective manner. Moreover, said capacitor must have a high capacitance per volume unit.

In accordance with the invention these and other objects are achieved with an electrolytic foil capacitor of the type mentioned in the opening paragraph, which is characterized in that the sealing ring is clamped between the cover and the inner surface of the housing in such a manner that the direction of the clamping force extends in the plane of the cover and that the housing is provided with a shear flange at its open end, which flange presses the sealing ring against the cover.

As in the case of the capacitor according to the invention the clamping force is not only axially directed but extends predominantly in the plane of the cover. The ridge in the housing of the capacitor, as described in DE-OS 28.05.644, can be omitted. This is very advantageous from the production-technical point of view. The reason for this being that the provision of well-defined and reproducible ridges in housings becomes more difficult as the housings are made smaller. This is particularly true when the housings are beam-shaped. Ridges having a poorly defined shape can cause leakage in electrolytic capacitors. Besides, the presence of a ridge near the seal of a capacitor adversely affects the maximum attainable capacitance per volume unit. Owing to the ridge, the space in the housing cannot be optimally filled with a roll.

Further, it has been found that the shear flange at the open end of the housing is necessary to obtain a proper sealing. The shear flange is provided after the cover with the sealing ring has been arranged in the open end in a clamping manner. The shear flange is provided by the cold deformation of a part of the inside of the aluminium housing. Preferably, a circumferentially closed shear flange is provided.

An advantageous embodiment of the electrolytic foil capacitor according to the invention is characterized in that the elastic sealing ring is composed of butyl rubber or ethylene propylene dimer rubber (EPDM-rubber). It has been found that using sealing rings of butyl rubber or EPDM-rubber very good seals can be realised. Butyl rubber has the advantage that it has a relatively high specific density. As a result thereof there is little diffusion of the electrolyte liquid through said rubber. EPDM-rubber has the advantage that it remains stable at relatively high temperatures. As a result thereof the seal is not attacked during the soldering of the capacitor to the PCB. Very thin foils which are made from such rubber materials and which have thicknesses ranging between 0.3 and 0.5 mm can be used as the sealing material. This has the advantage that the thickness of the rubber-filled slot between the metal cover and the metal housing of the capacitor is very small and that the diffusion distance throughout the rubber is relatively long. As a result thereof, the electrolyte diffusion through the rubber is negligibly small. By virtue of the presence of the shear flange the diffusion distance is extra long.

In experiments leading to the present invention it has been found that when a butyl rubber or an EPDM-rubber foil having a thickness of 0.3–0.5 mm is used as the elastic sealing material, an optimum sealing is obtained when the dimensions of the cover and the housing are matched in such a manner that the rubber between the cover and the housing is compressed to approximately 50% of its original thickness. When such a rubber foil having a thickness of 0.4 mm is used, the slot must be approximately 0.2 mm. If the slot is considerably larger, the risk of leakage increases substantially. If the slot is considerably smaller, there is a great risk that the rubber will break when the cover is provided in the housing.

BRIEF DESCRIPTION OF THE DRAWING

Embodiments of the invention will be explained by means of the drawing, in which.

DESCRIPTION OF THE PREFERRED EMBODIMENTS

Figure 1:
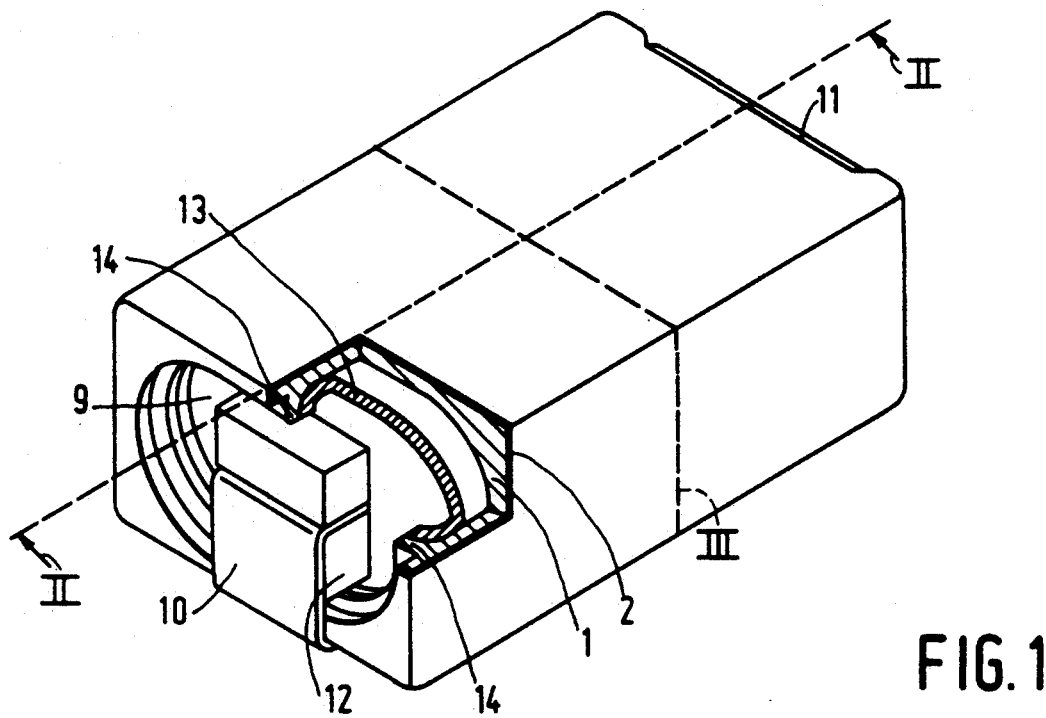
FIG. 1 is a perspective, partly cut-away view of an electrolytic foil capacitor according to the invention.
Figure 2:
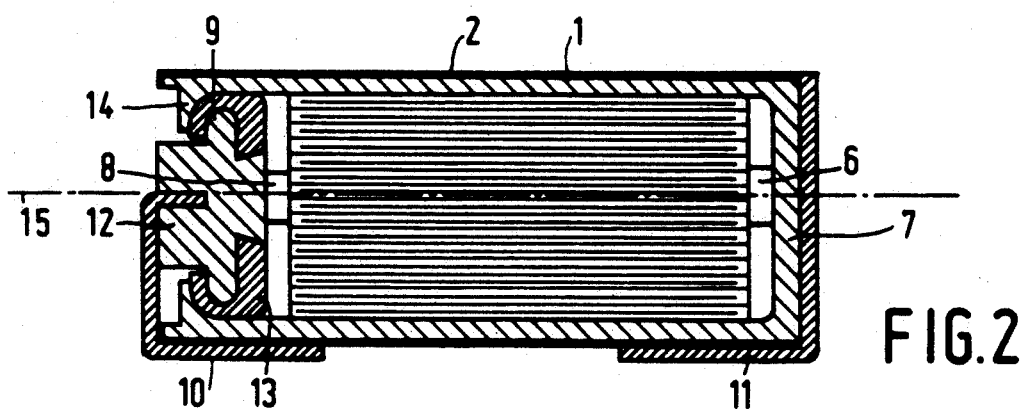
FIG. 2 is a cross-sectional view of the capacitor of FIG. 1, taken on the line II.
Figure 3:
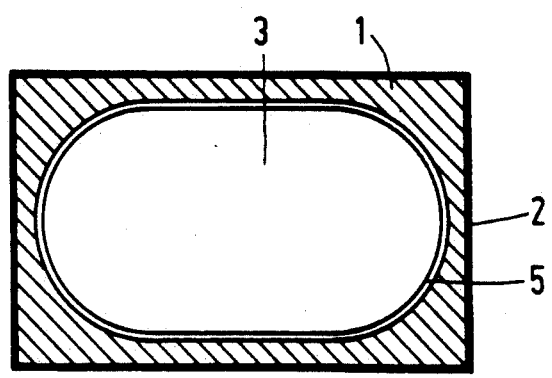
FIG. 3 is a cross-sectional view of the inventive capacitor of FIG. 1, taken on the line III.

FIGS. 1-3 depict the same electrolytic foil capacitor according to the invention. For this reason, corresponding parts in the various Figures bear the same reference numerals.

Figure 4A:
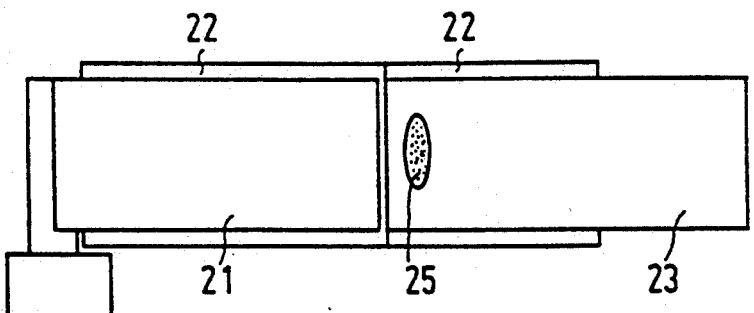
FIGS. 4a, 4b and 4c show how individual foils can be assembled into a capacitor roll.
Figure 4B:
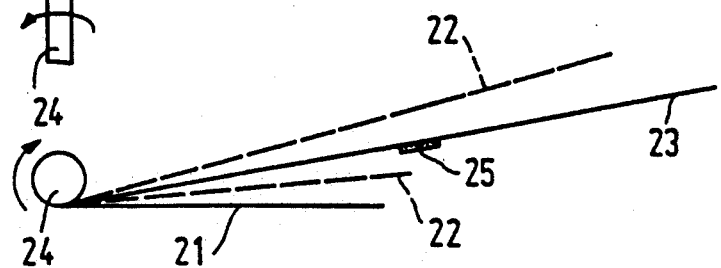
Figure 4C:
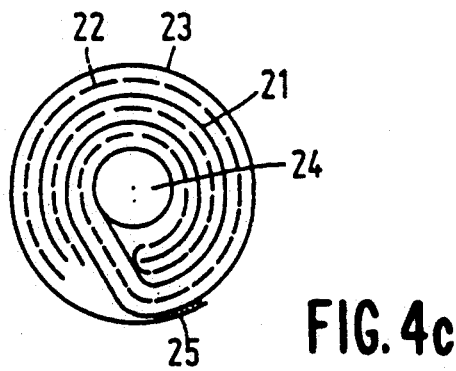

The inventive capacitor shown in FIG. 1 comprises a beam-shaped aluminium housing 1 which is externally provided with an electrically insulating layer 2 of synthetic resin. The presence of the insulation layer is not essential. The space 3 for the roll (see FIG. 3) consists of a somewhat oval cavity in which a flattened roll 4 is accommodated. For clarity, only FIG. 2 diagrammatically shows the roll and FIG. 3 only shows the boundary lines 5 of the roll. FIGS. 4a-4c show the structure of the roll and how the roll is manufactured. The roll is composed of an assembly of a strip of aluminium foil 21 (anode) which is provided with a dielectric oxide layer by forming, two or more separator foils 22 impregnated with electrolyte liquid or with a solid semiconducting metal oxide, and a strip of a second aluminium foil 23 (cathode), either formed or not, which are wound together to form a roll by means of a winding mandrel 24. By selecting the cathode foil 23 to be somewhat longer than the other strips, the roll can be readily bonded by means of an adhesive. For this purpose, the overlength of the cathode foil 23 is provided with a drop of adhesive 25, such as liquid polyphenylene sulphide (PPS). When the cathode foil is subsequently wrapped around the roll, the overlength allows a closed turn of cathode foil to be formed by bonding at the overlap. Subsequently, the winding mandrel 24 can be removed from the roll and, if necessary, the roll can be flattened. FIG. 4a shows the assembly of the foils 21-23 and the winding mandrel before the foils are wound up. FIG. 4b shows a side view of FIG. 4a. FIG. 4c shows the bonded roll.

By means of a cathode tag 6 projecting from the roll, the cathode foil is attached to the bottom 7 of the housing by welding. The anode foil is attached to a flat metal cover 9 through an anode tag 8 projecting from the roll. The anode connection 10 and the cathode connection 11 are secured to a projection 12 of the cover 9 and to the bottom 7 of the housing, respectively, by welding and riveting. In the drawing, the cathode connection 11 is L-shaped. It is alternatively possible to use U-shaped connections which surround the closed front end of the beam-shaped housing 1 in a clamping manner. The anode connection 10 is fixed in a slot of the projection 12.

Between the cover 9 and the housing 1 there is provided an elastic sealing ring in the form of a thin butyl rubber foil 13. The thickness of the elastic foil in the unloaded state is 0.4 mm. The housing 1 and the cover 9 are dimensioned such that there is a 0.2 mm slot between them along the entire circumference of the cover. As a result thereof, the foil 13 in the finished product is compressed to approximately 50% of its original thickness at the location of the slot. By virtue of the elasticity of the butyl rubber foil 13, the cover 9 is clamped onto the housing 1. The clamping force extends substantially in the plane of the cover, i.e., perpendicularly to the direction of the longitudinal axis 15 of the capacitor shown in FIG. 2. The foil provides electrical insulation between the housing and the cover. The foil also counteracts the diffusion of electrolyte liquid from the roll space outwards. By virtue of the presence of shear flange 14, the diffusion path of the liquid becomes extra long, so that diffusion is further impeded.

The cover 9 shown in FIG. 2, which serves as an anode-feedthrough between the anode connection and the anode foil, is shown as a flat metal disc having an essentially oval shape. It is alternatively possible to use a cover having a winding mandrel on which the roll is wound. In such case, the anode foil can be directly welded to the mandrel, so that the anode tag 8 is superfluous.

Figure 5:
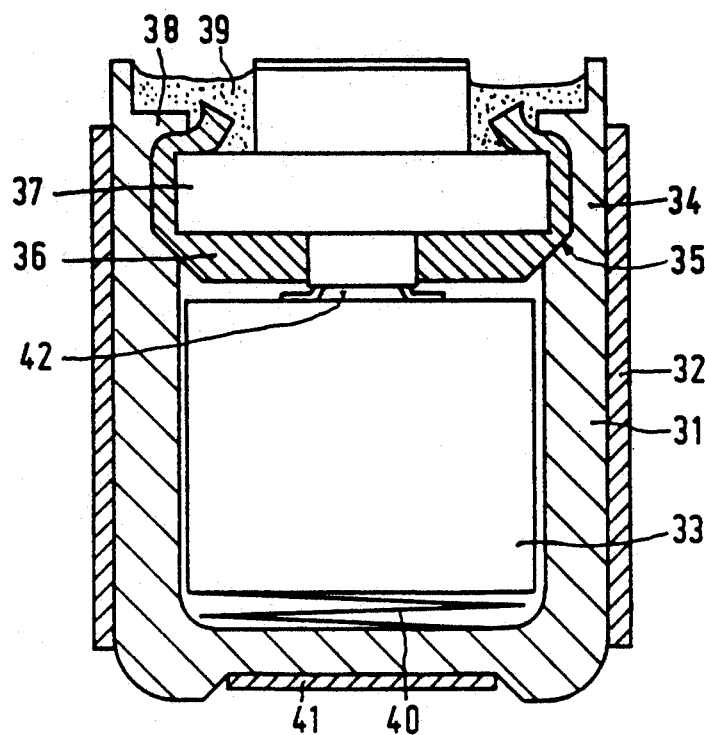
FIG. 5 is a sectional view of another embodiment of the electrolytic foil capacitor according to the invention.

A further embodiment of the electrolytic foil capacitor according to the invention is shown in FIG. 5. This capacitor comprises an aluminium, beam-shaped housing 31, a large part of the outside of which is coated with an insulation layer 32 of synthetic resin. The housing contains a foil capacitor 33, as described with reference to FIG. 4. The housing is constructed such that it has a thinner end portion 34, consequently, the somewhat oval cavity at the location of the end portion is enlarged. Owing to this, a transverse surface 35 is formed around the cavity, which edge enables an improved positioning of the flat metal cover 37, comprising sealing ring 36, on the surface 35. This Figure clearly shows that the part of the rubber sealing ring 36 which is disposed between the cover 37 and the housing 31 is compressed to approximately 50% of its original thickness.

The end portion of the housing 31 also comprises a shear flange 38 which is provided around the oval cavity. The aperture is closed further by an epoxy layer 39. This layer 39 leads to an improved stabilization of the cover on the surface 35.

The electrolyte foil capacitor shown further comprises a cathode tag 40 which attaches the cathode foil of the roll to the bottom 41 of the housing. The anode foil is attached to the cover by means of anode tag 42.

The above-described electrolytic foil capacitor can very suitably be used in the mounting of SMDs. It exhibits favourable mounting properties. Within the dimensions of SMDS, a series of capacitances can be realised from 100 to 680 $\mu C$ at 10 $V_R$ and higher at a construction height of 3 mm. The inventive capacitor exhibited no leakage in life tests and solder tests.

We claim:

1. An electrolytic capacitor comprising a longitudinally extending metal housing including a first portion containing a capacitor roll which is impregnated with electrolyte liquid and a second portion closed by a cover, said capacitor roll being inserted through the second portion before installation of the cover, characterized in that:

a. the second portion includes a circumferential flange extending inwardly from an inner surface of the housing;
   b. said inner surface of the housing defines a substantially constant cross sectional area from at least the flange to the first portion;
   c. the cover includes a peripheral portion which is disposed in the second portion and has juxtaposed surfaces which are continuously proximate the inner surface of the second portion and a transversely extending surface of the flange, respectively;
   d. the capacitor is sealed by an elastic sealing ring which is compressed between the juxtaposed surfaces of the peripheral portion and the respective proximate surfaces of the housing.

2. A capacitor as claimed in claim 1, characterized in that the elastic sealing ring is composed of butyl rubber.

3. A capacitor as claimed in claim 1, characterized in that the elastic sealing ring is composed of EPDM-rubber.

4. A capacitor as claimed in claim 2 or 3, characterized in that the rubber present between the cover and the housing is compressed to approximately 50% of its original thickness.

* * * * *